United States Patent [19]
Martin et al.

[11] Patent Number: 5,083,974
[45] Date of Patent: Jan. 28, 1992

[54] TURKEY BREAST DEBONER

[75] Inventors: Eugene Martin, Denver; William Hamer, Mountville, both of Pa.

[73] Assignee: Foodcraft Equipment, Inc., Md.

[21] Appl. No.: 614,432

[22] Filed: Nov. 16, 1990

[51] Int. Cl.⁵ ............................................. A22C 21/00
[52] U.S. Cl. ..................... 452/169; 452/154
[58] Field of Search ............. 452/169, 166, 165, 154

[56] References Cited

U.S. PATENT DOCUMENTS

| | | | |
|---|---|---|---|
| 2,793,392 | 5/1957 | Cutrera | 452/135 |
| 4,023,237 | 5/1977 | Meyn | 452/120 |
| 4,486,920 | 12/1984 | Tieleman et al. | 452/120 |
| 4,648,155 | 3/1987 | Burnett | 452/169 |
| 4,769,872 | 9/1988 | Hazenbroek et al. | 452/169 |
| 4,935,990 | 6/1990 | Linnenbank | 452/169 |
| 4,937,918 | 7/1990 | Martin | 452/169 |
| 4,993,111 | 2/1991 | Martin et al. | 452/169 |

*Primary Examiner*—Willis Little
*Attorney, Agent, or Firm*—Shoemaker and Mattare, Ltd.

[57] ABSTRACT

An apparatus for producing boneless turkey breasts comprises a conveyor for supporting an upper half of a turkey along a first path, and a separate conveyor for securing the wings of the turkey and pulling them away from the first path as the upper half is pivoted away from the wings, to pull the breast meat from the carcass. The wings are subsequently cut from the breast fillets by a rotary cup knife which is directed over and around the shoulder joint.

12 Claims, 8 Drawing Sheets

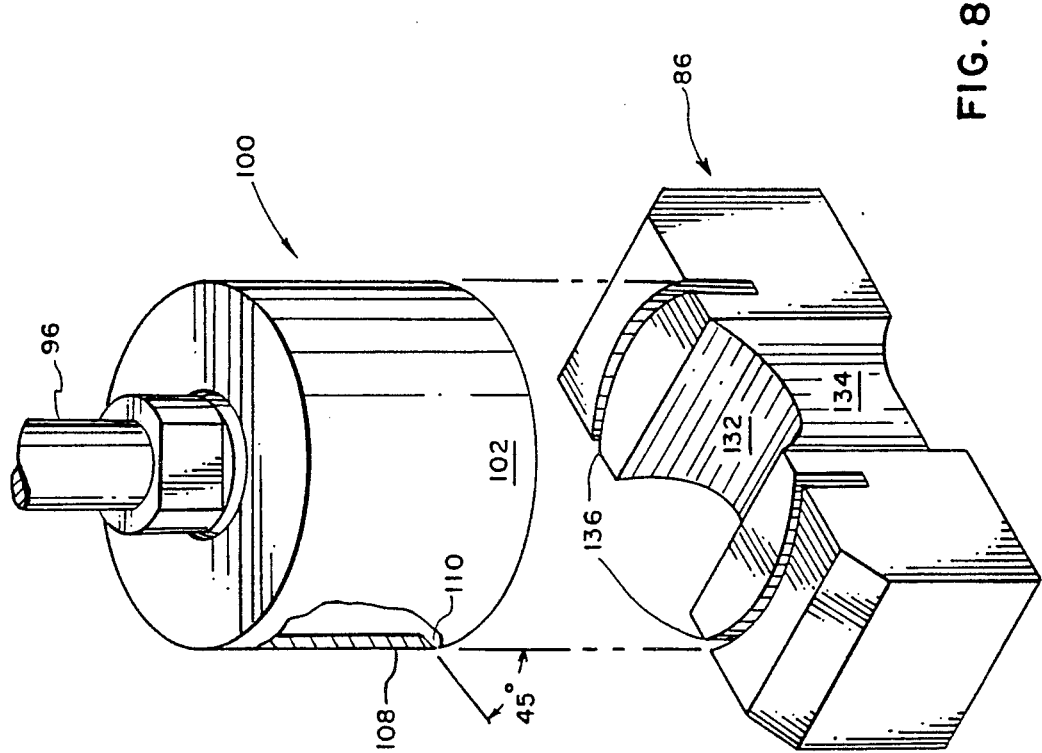

5,083,974

TURKEY BREAST DEBONER

BACKGROUND OF THE INVENTION

1. Field of the Invention

This invention relates to the art of butchering, and particularly to a method of producing boneless turkey breasts (breast fillets) and an apparatus for carrying out the method.

2. Description of the Prior Art

Prior methods and apparatus for separating turkey wings from breast meat allow a considerable portion of the shoulder muscle to remain attached to the wing. Inasmuch as breasts fillets sell for several times the per-pound price of wings, it is desirable to cut the wings from the breasts in a way that maximizes the amount of meat remaining on the breast. This must be done without creating bone chips or otherwise increasing the rejection rate of the breasts, and should produce grade "A" wings as well. We addressed this problem in our prior patent, U.S. Pat. No. 4,937,918.

SUMMARY OF THE INVENTION

In our prior patent, we provided a rotating disc type blade for performing the wing cut. While the chicken processing apparatus in general can be scaled up to handle turkeys, the rotary disc blade has not proven satisfactory for turkey breast processing.

Therefore, it is an object of this invention to provide an improved method and apparatus for separating wings from deboned turkey breasts. It is also an object of the invention to produce increased average yields by minimizing the amount of meat left at the shoulder joint of the wing as it is removed.

The invention includes a method of cutting a turkey wing from its breast at the shoulder joint, comprising steps of positioning the should joint on a rest having a relief in its upper surface to locate the joint, and then cutting downward through the tissues of the breast only, around said shoulder joint, with a rotary cup-type knife.

The invention also provides a device for cutting poultry wings from breasts at their shoulder joints, comprising a conveyor for transporting a series of breasts, with wings attached, along a path, wherein the conveyor has a series of rests for accurately supporting the shoulder joints, and a cup-type knife for severing tissue around the shoulder joint. The conveyor is driven intermittently, so that it has a dwell period during the cutting operation.

BRIEF DESCRIPTION OF THE DRAWINGS

In the accompanying drawings,

FIG. 8 is a detail view of a wing rest shown in FIGS. 6 and 7.

DESCRIPTION OF THE PREFERRED EMBODIMENT

Figure 1:
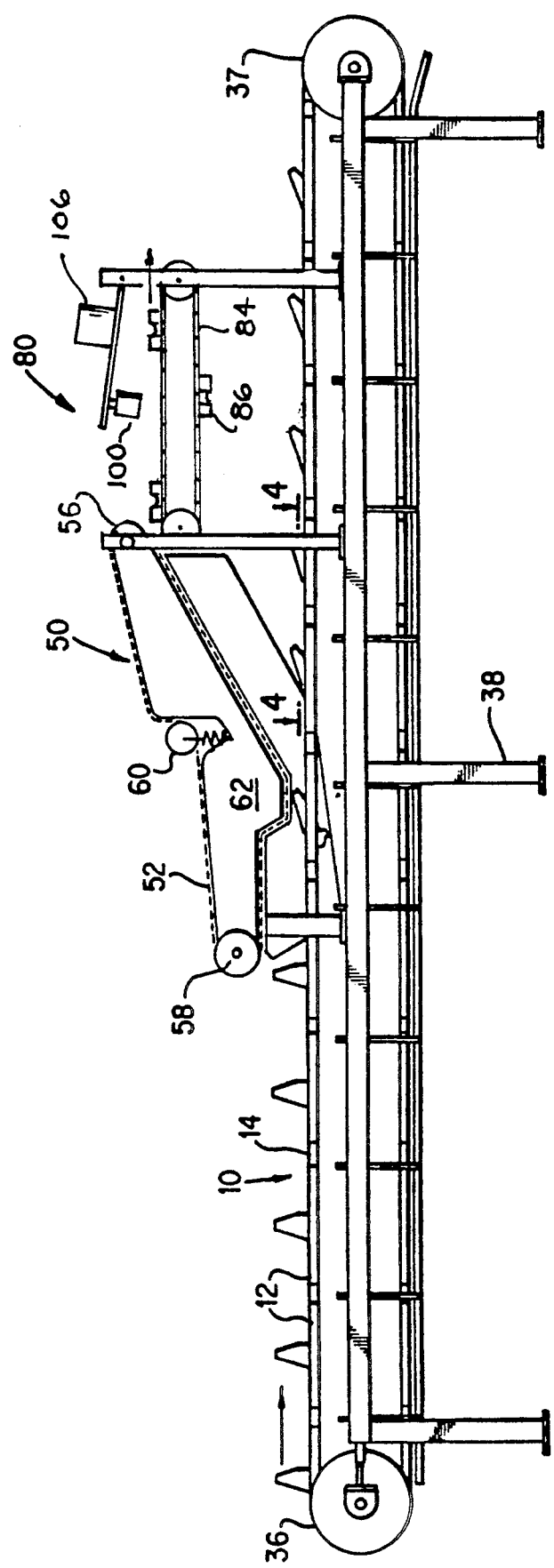
FIG. 1 is a side elevation of an apparatus embodying the invention.
Figure 2:
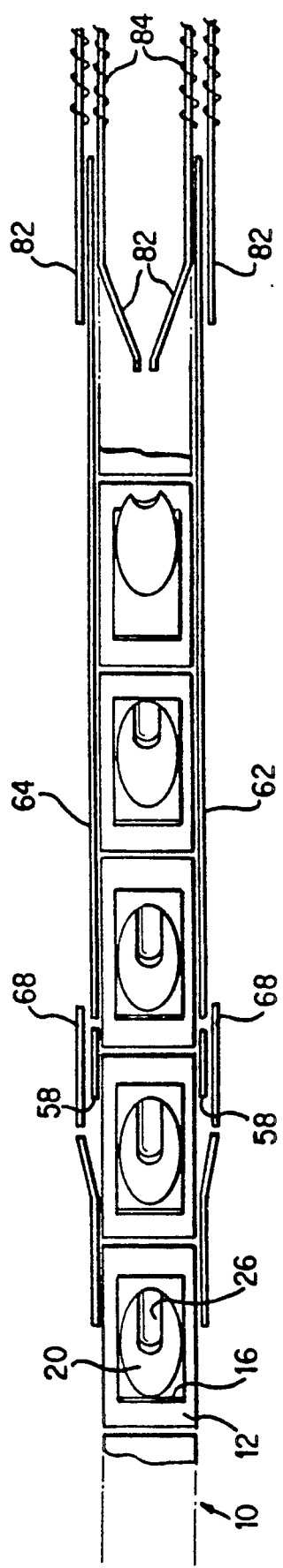
FIG. 2 is a top elevation thereof.
Figure 3:
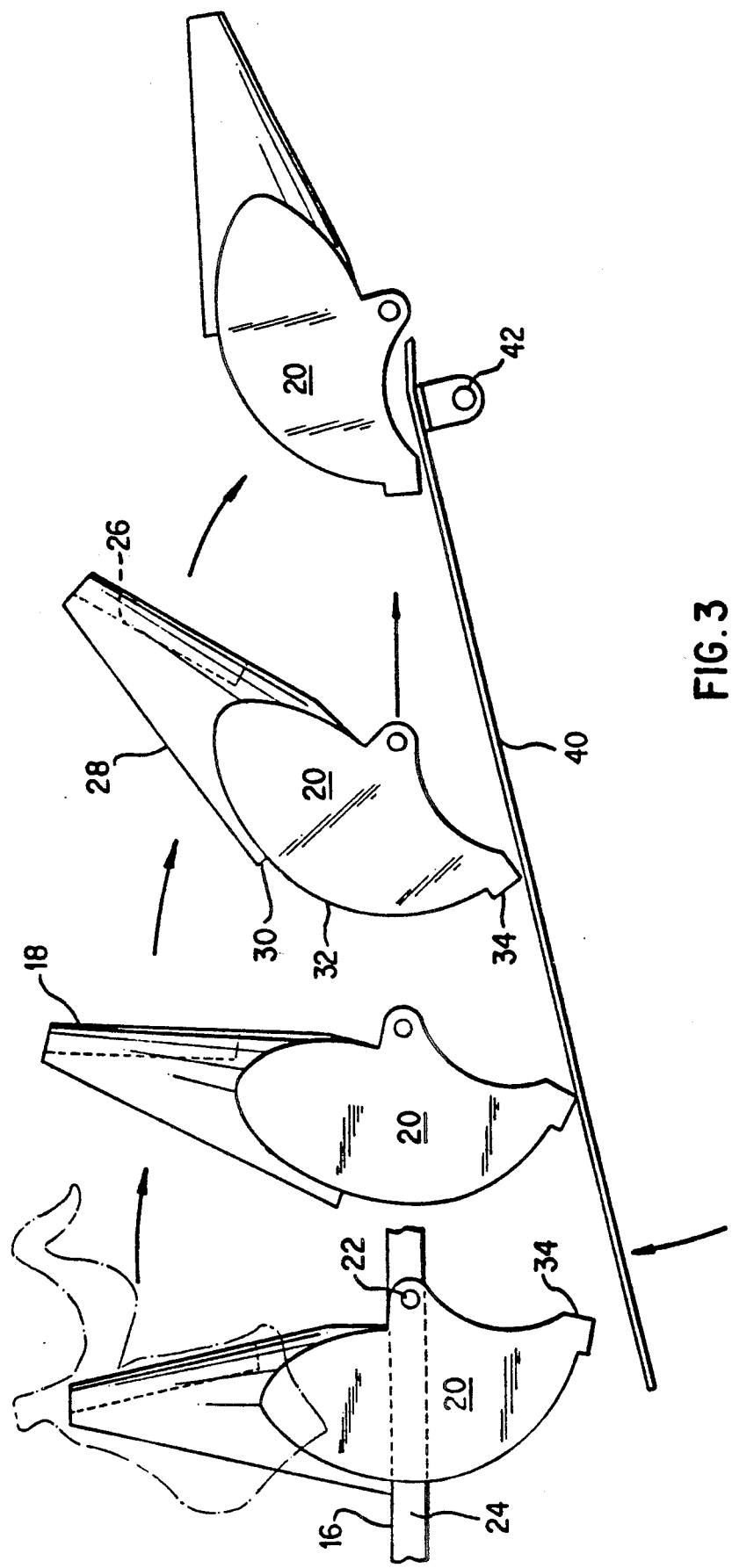
FIG. 3 is a detail of a carcass fixture, showing successive positions thereof.

Referring to FIGS. 1-2, an apparatus embodying the invention comprises a first conveyor 10 including an endless loop of metal plates 12 flexibly linked to one another at joints 14. Every other plate has a rectangular aperture 16 therein through which protrudes the nose 18 of a carcass fixture 20 (FIG. 3), this fixture being pivotally supported by a rod 22 extending through side flanges 24 of the plate. The fixture nose 18 is generally conical, and has a rounded groove 26 in its forward face, designed to engage the neck and backbone of the front half of a bird placed on the fixture with its back facing the direction of movement. The rear face 28 of each fixture nose is provided with stop shoulder 30 for limiting rearward pivoting of the nose. The bottom end of the fixture opposite the nose, on the opposite side of the plate, has a radiused periphery 32 terminating at a protrusion 34 that both limits the forward pivoting motion of the fixture, and also acts as a cam follower when engaged by a stationary cam described below.

The interconnected series of plates are supported at two ends by respective pairs of sprockets 36,37 (FIG. 1) whose geometry conforms to that of the links, one of the sprockets being powered by a motor, not shown. Between the sprockets, the plates are supported by the apparatus frame 38, along which they slide.

A stationary ramp or cam 40 (FIG. 3) is placed beneath the upper run of the first conveyor, in a position which interferes with the protrusion 34 of each fixture 20, thus to cause the fixture to tip forward at that point. The downstream end of the cam 40 is pivotally attached to the frame 38 at 42; the elevation of the upstream end can be adjusted by means, not shown, to vary the angle of inclination of the cam.

A second endless conveyor 50, running in synchronization with the first, and at the same speed thereas, is located above the first conveyor, as shown in FIG. 1. The second conveyor comprises a pair of identical chains 52, 54, each running on a drive sprocket 56, a toothless idler wheel 58, and a resiliently biased tension wheel 60. The chains are guided around an irregular path defined by the edges of plastic walls 62,64, which also serve to confine the body of the bird. Each link of each chain has a series of protruding tabs 66 extending in the plane of the chain, on both lateral sides thereof, inwardly and outwardly in regular repeating groups. These tabs serve to retain the chains on their guides, and also act as pushers for the wings once the wing and breast assembly has been peeled from the carcass. There are no flights extending between the spaced chains.

Figure 5:
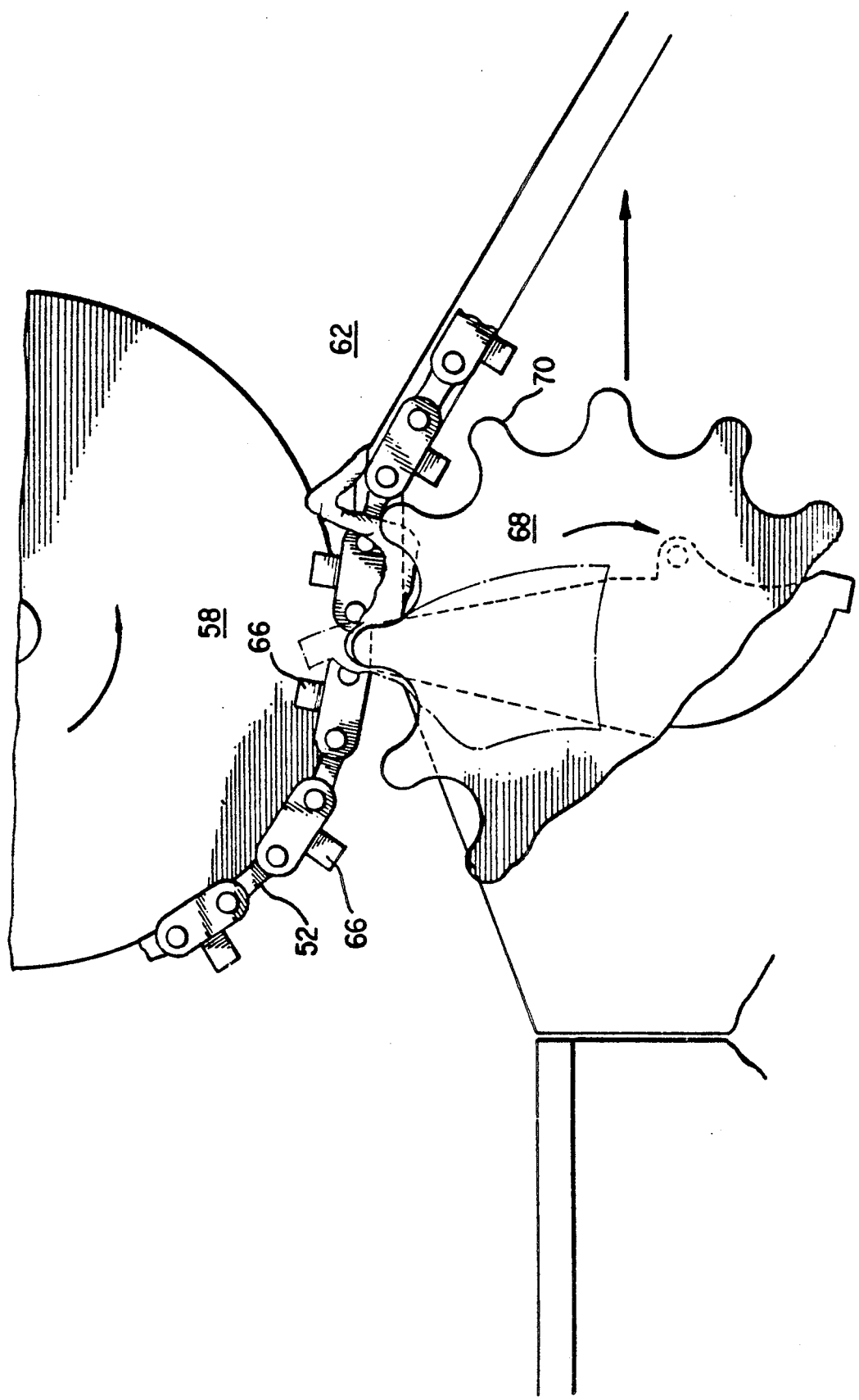
FIG. 5 is a detailed view, partially broken away, of a wing indexing mechanism.

At the upstream, freewheeling, end or terminus of the second conveyor, the idler wheels 58 are linked to a pair of spaced indexing sprockets 68, each having ten rounded protuberances 70 thereon, as shown in FIG. 5, for capturing the wings of each bird and positioning them between the more widely separated sets of inwardly facing ears. These sprockets rotate in synchronization with the second conveyor.

Figure 4:
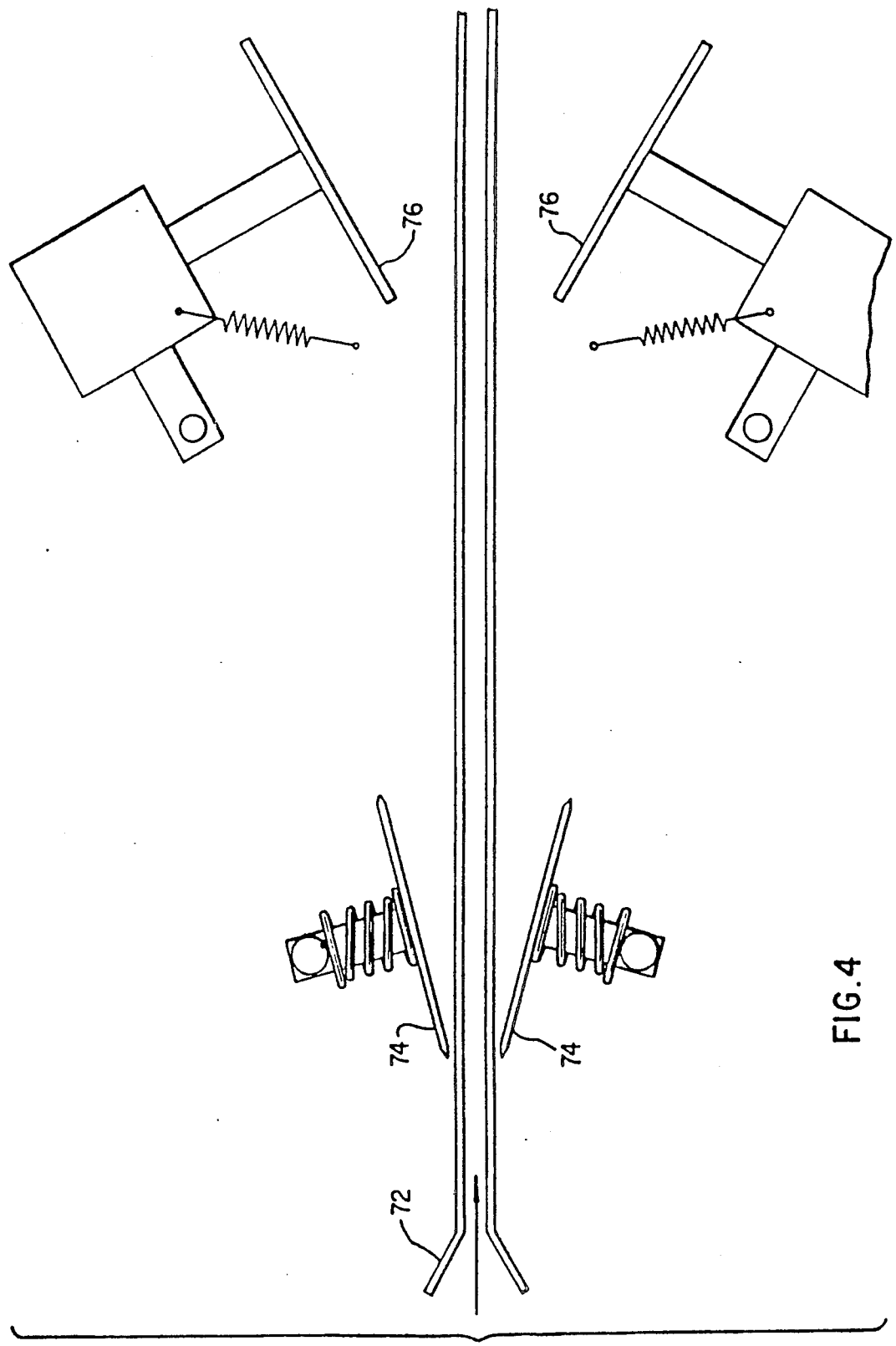
FIG. 4 is a sectional view taken along the line 4—4 in FIG. 1.

Referring to FIG. 4, downstream of the point at which the breasts are peeled from the carcass, and just above the first conveyor, there are, in series: a Vee-shaped keel aligner 72, a pair of freewheeling rotary blades 74 for cutting membranes that attach the tenders to the keel, and a pair of freewheeling squared edged disks 76 for pushing the tenders away from the carcass. The rotary blades and the disks are each mounted on axes that extend away from the center of the apparatus downward and rearward, with respect to the direction of product movement, at slight oblique angles. Each blade and each disk is spring loaded toward the vertical center plane of the apparatus.

The upper conveyor's lower run is defined by the edges of the product-confining walls 62 and 64, as mentioned above. As shown in FIG. 1, the chain path follows a first horizontal segment, a downward incline, a second horizontal segment (it is here that the breast filets are removed from the carcass—see below), and finally an upward incline to the wing cutting device 80. En route to the wing cutter, spaced pairs of guide rods 82 (FIG. 2) engage and confine the wings at the shoulder joints, as the breast/wing assembly is advanced by the upper conveyor.

The wing cutting device 80 includes a third, horizontal conveyor 84, comprising a pair of spaced endless chains 85 each supported by a pair of sprockets. This conveyor is driven by a mechanical power take-off device (not shown) including an Geneva-type drive that produces intermittent motion in the third conveyor 84. The conveyor chains have a series of rests 86 affixed attached at intervals, and the upper surface of the rests is slightly below the level of the upper conveyor at the latter's downstream terminus, from which the product is received. The structure of the rests is described in greater detail below.

A pair of downwardly spring-biased wing loading bars 88 astride the upper conveyor are provided to seat the wing joints properly on the rests 86. These bars slightly overlap a pair of stationary guide rails 89 extending parallel and outside the cutter conveyor, to hold the first joint of the wings down, in an approximately vertical position.

Figure 6:
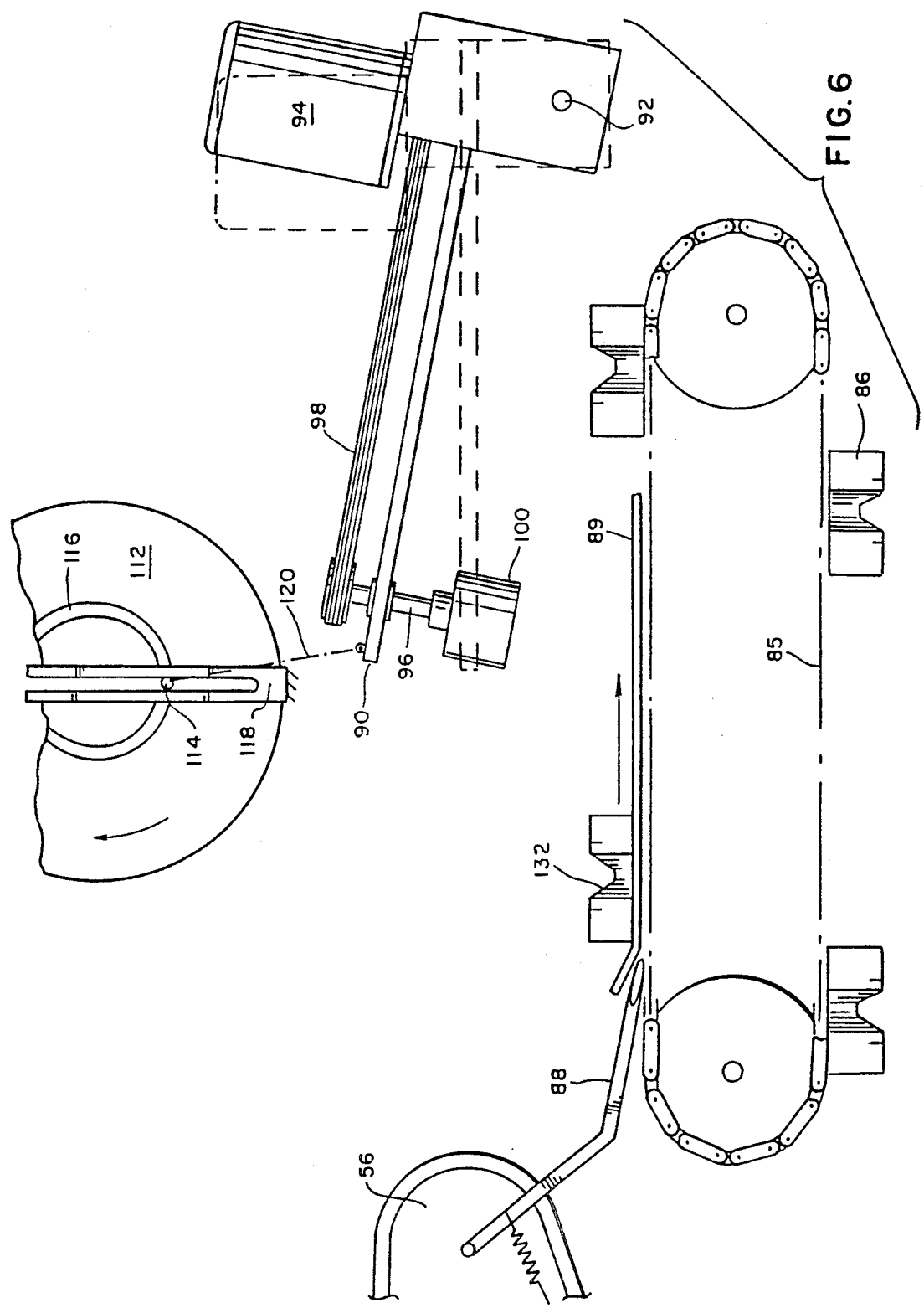
FIG. 6 is a side elevation of a device for severing wings from breasts.
Figure 7:
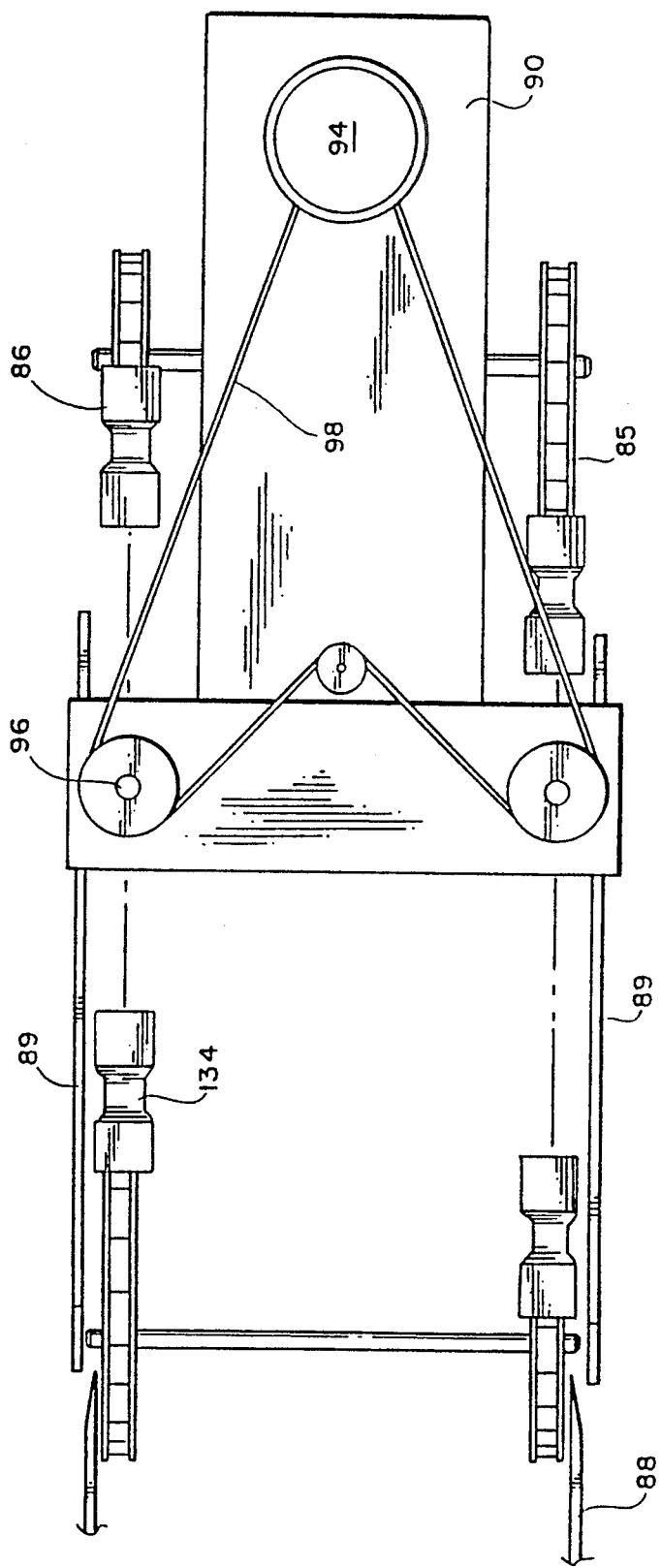
FIG. 7 is plan view thereof.

As shown in FIGS. 6 and 7, the cutter 80 includes a frame 90 supported over the conveyor, and pivotally connected to the main frame at 92. A motor 94 mounted atop the frame is coupled to a pair of parallel, vertical cutter driveshafts 96 through a belt drive 98.

A rotary cup knife 100 is affixed at the lower end of each driveshaft, above each conveyor chain. Each cup knife comprises a cylindrical blade 102 attached at the bottom end of a respective driveshaft 96. Each cup knife has a cylindrical outer surface 108 and an inwardly beveled lower peripheral edge 110 making an angle, preferably, of about 45° with respect to the outer surface 108. Therefore, the bottom edge of each blade constitutes a frustoconical surface having a 45° apex angle. The edge 110 is ground razor sharp, and then hardened to preserve the edge. The upper end of each cup knife has a cylindrical socket for receiving its driveshaft. Wrench flats are formed on the outside of the socket to facilitate installation and removal.

The frame 90 is oscillated up and down, in synchronization with movement of the conveyor, by a cam 112 mounted on a horizontal axis above the conveyor. This cam is driven continuously by a power take-off (not shown) from the main conveyor drive. A follower 114, riding in an eccentric groove 116 on the side face of the cam, is required to follow a substantially vertical path by a slotted, stationary member 118. The follower is affixed to the upper end of a link 120, whose lower end is hinged to the frame 90. The cam is indexed so that the cutters 110 are lowered during the dwell period of the conveyor, so that there is no relatively horizontal movement between the product and the blades as cutting occurs.

FIG. 8 shows in detail one of the plastic rests 86 affixed to the conveyor chains at twenty-four inch intervals, the same as the interval between the fixtures 20 on the main conveyor. Each of these rests, viewed horizontally, has an arcuate relief 132 extending transversely across its upper surface. As seen in FIGS. 7 and 8, there are also vertically extending reliefs 134 on either side of each rest. These reliefs are sized to fit beneath the shoulder joint; they both precisely locate the joint beneath the knives, and also avoid presenting sharp edges which could damage the product. Each rest also has a circular groove 136 (actually two semi-circular grooves, since the diameter of the cup knife is greater than the width of the rest) extending downward from its upper surface, the width of the groove being slightly larger than the shell thickness of the knives, so that the knife can penetrate through the shoulder, and a distance into the rest, during cutting.

The downward stroke of the knives, with respect to the rests, is chosen so that the knife makes a semicircular cut through the tendons at the front and rear of the joint. It should be noted that, even at the bottom of its stroke, the knife does not contact the product over its entire circumference, so that the cut is only semicircular. Because of this, the wing meat is not damaged, and is suitable for high grading.

In operation, the processing apparatus is set in motion, so that the cones or fixtures 20 are driven in the direction of the arrow in FIG. 1. The front half (whole breast, back and wings) of a bird is firmly placed upon the fixture, with the back of the bird facing in the direction of movement of the fixture (i.e., downstream). An initial cut is made manually into each shoulder joint to separate the breast and wing bones. The fixture then moves the bird in the downstream direction, through a safety gate, which excludes workers' hands and other objects. Shortly thereafter, the bird, passing between the lateral walls which closely confine it, encounters the unequally spaced protruding tabs 66 of the upper conveyor chain; the lobes on the sprockets 68 at the entry point index the bird so that the wings rest properly between the more widely spaced tabs. Now the birds are supported not only by the cone fixture from the inside, but also by the wings, which are kept over the edges of the respective walls 62 and 64, between the tabs 66 of the conveyor chains.

Initially, the wings are not in tension. Presently, however, the protrusion 34 at the bottom of the fixture—upon which the bird is mounted—is engaged by the sloping cam 40 beneath the first conveyor, and the fixture 20 is forced to tip forward about its pivot rod 22, from a substantially vertical position to a substantially horizontal one. Inasmuch as the carcass of the bird is firmly positioned on the fixture, the rib cage of the bird is forced to move with the fixture. The wings, however, remain captured between the upper conveyor and the lateral walls. Initially, the path of the upper conveyor descends to follow the carcass, but soon, it diverges upward. Despite the fact that the shoulder joints have previously been severed, the strength of the tissues joining the wings to the breast meat is adequate to peel the breast filets (pectoralis major) from the carcass. Now, the boneless, interconnected breast filets, with the wings still attached, follow the upper conveyor, while the carcass remains with the lower conveyor. As the carcass proceeds further, the tenders (or tenderloins, pectoralis minor), which remain on the top of the carcass, as they do not peel off with the breast filets, are engaged by the rotary blades 74, described above, which sever the membranes holding the tenders to the carcass. Thereafter, the tenders are engaged by the squareedged discs 76 which tend to plow the tenders away from the carcass, facilitating manual removal of the tenders subsequently.

Meanwhile, the deboned whole breasts, with wings attached, have been carried by the upper conveyor to the wing removing device 80 shown in detail in FIGS. 6–8. As the breasts, now moved solely by the tabs 66 of the upper conveyor chains engaged behind the shoulders, approach the upper end of the incline, they engage the wing loading bars, which yield upward, but maintain downward pressure on the wings, adjacent the shoulder joints, to ensure proper transfer onto the cutter device conveyor.

Although the motion of the second conveyor 50 is continuous, and that of the cutter conveyor is intermittent, owing to the intermittent drive in the power take-off, these two conveyors are nevertheless mechanically interconnected, and can therefore be indexed with respect to each other so that each shoulder joint arrives at the upper conveyor at the right moment to become seated in the upper relief of one of the rests on the cutter conveyor. Henceforth, the breasts are supported on either side only by the rests, and are carried along intermittently by the cutter conveyor.

As the upper segments of the wings clear the free ends of the wing loading bars, they are captured under the stationary rails, which have inclined upstream ends. The horizontal portions of the guides bar holds each wing substantially downward, against the side relief of its rest, as the wing passes under the cutter knife.

As each rest passes beneath its respective knife 100, there is a dwell in conveyor motion, produced by the intermittent drive discussed above. At this moment, the cam drive lowers the cutter frame, and the knives cut through the tendons at the front and rear of the joint, completely severing the wing as the knife enters into the corresponding groove in the rest. Then the cutter frame raises, and movement of the conveyor resumes. The wings and breast fillets now fall onto separate bins or conveyors (not shown) for further processing or packaging.

It will be apparent that functionally equivalent means may be substituted for the specific elements described above. For example, non-rotating cup knives might be employed, or means for supporting the shoulder joints, other than the rests described above may prove useful.

Inasmuch as the foregoing description and the drawings described only one embodiment of the invention, which may be subject to variation and changes in detail, the embodiment described should be regarded only as illustrative of the invention defined by the following claims.

We claim:

1. A method of cutting a turkey wing from its breast at the shoulder joint, comprising steps of
   positioning said shoulder joint on a rest having a relief in its upper surface to locate the joint, and then
   cutting downward through tissues of the breast only around said shoulder joint with a rotary cup-type knife.

2. The invention of claim 1, further comprising a step of holding the upper segment of the wing against the side of the rest during said cutting step.

3. A device for cutting poultry wings from breast at their shoulder joints, comprising
   a conveyor for transporting a series of breasts, with wings attached, along a predetermined path,
   means carried by said conveyor for supporting said breasts and wings beneath their shoulder joints, and for positioning said shoulder joints at accurately spaced intervals,
   a cup-type knife for severing tissue around said shoulder joint, and
   means for periodically advancing said knife towards said supporting means and through the joints supported thereby, to separate the wings from the breasts.

4. The invention of claim 3, further comprising a device for producing intermittent motion of said conveyor, and means for synchronizing movement of said knife with dwell periods of said conveyor.

5. The invention of claim 4, further comprising a movable cutter frame supporting said knife, wherein the synchronizing means and advancing means together comprise a cam, a follower driven thereby along a linear path, and means linking said follower to said cutter frame.

6. The invention of claim 5, wherein the conveyor is supported by a stationary main frame, and the cutter frame is pivotally connected to the stationary frame on a horizontal pivot axis.

7. The invention of claim 3, further comprising a motor for driving said knife.

8. The invention of claim 3, wherein said supporting means comprises a series of rests affixed at regular intervals to the conveyor, each of said rests having a relief in its upper surface approximately as wide as the shoulder joint, for accurately positioning the joint with respect to the knife.

9. The invention of claim 8, wherein each of said rests has a vertically extending relief in its side surface to receive and position the upper segment of the wing.

10. The invention of claim 9, further comprising means for holding the upper wing segments in said vertically extending relief while the joint is cut.

11. The invention of claim 10, wherein said holding means comprises a stationary rail extending parallel to said conveyor and outboard thereof.

12. The invention of claim 8, wherein said rest has a groove in its upper surface, for receiving said cut knife, to allow the knife to cut completely through the joint.

* * * * *